United States Patent [19]

Spiegelberg

[11] Patent Number: 4,756,298
[45] Date of Patent: Jul. 12, 1988

[54] APPARATUS FOR MACHINING RELATIVELY HARD BUILDING MATERIAL

[75] Inventor: Ulf Spiegelberg, Niederwil, Switzerland

[73] Assignee: Fritz Haug AG, St. Gallen, Switzerland

[21] Appl. No.: 927,474

[22] Filed: Nov. 6, 1986

[30] Foreign Application Priority Data

Nov. 7, 1985 [CH] Switzerland .......................... 4786/85

[51] Int. Cl.⁴ .............................................. B28D 1/04
[52] U.S. Cl. ........................................ 125/14; 60/426; 51/165.92
[58] Field of Search ............... 60/426, 430; 51/165.92; 125/14

[56] References Cited

U.S. PATENT DOCUMENTS

| 2,488,643 | 11/1949 | Smith | 125/14 |
| 3,877,180 | 4/1975 | Brecker | 51/165.92 |
| 3,975,909 | 8/1976 | McBurnett | 60/430 |
| 4,310,198 | 1/1982 | Destree | 125/14 |
| 4,553,389 | 11/1985 | Tischer et al. | 60/430 |

Primary Examiner—Harold D. Whitehead
Attorney, Agent, or Firm—William R. Hinds

[57] ABSTRACT

The drive motor (1) drives a machining tool (2) which can be fed forwardly by means of a feed motor (3). Both motors (1, 3) are supplied with pressure fluid by the same hydraulic pump (4). A quantitative divider valve (5) divides the oil flow coming from the hydraulic pump, a control valve (24) controlling the flow of pressure fluid in the forward feed motor in such a way that the power output at the forward feed motor falls with increasing resistance at the machining tool, thereby providing for output-regulated operation of the machining tool. In the same way as the forward feed movement, the feed movement in respect of depth of the machining tool can also be produced by way of a depth feed motor (7).

4 Claims, 3 Drawing Sheets

APPARATUS FOR MACHINING RELATIVELY HARD BUILDING MATERIAL

The invention relates to an apparatus for machining relatively hard building materials as set forth in the classifying portion of claim 1. That equipment primarily involves concrete cutting or drilling machines with diamond-tipped tools. Apparatuses of that kind are being increasingly frequently used in building works above and below ground as it is often easier for openings which are to be provided for example in a concrete wall to be sawn out subsequently, rather than producing the openings by the use of shuttering in the initial concrete pouring operation.

The machining tool is generally advanced along a rail by means of a pinion. As the torque at the machining tool is subjected to substantial fluctuations, the tool feed must be controllable in order to provide that the power at the drive motor or the machining tool is as constant as possible.

WO No. 84/00055 discloses a valve for the above-indicated purposes, wherein a pressure-controlled quantitative limiting valve is arranged in the feed conduit to the forward feed motor. The amount of oil which is supplied to the feed conduit can be adjusted by a variation in cross-section. The remaining amount of oil is fed to the drive motor. When a predeterminable pressure is exceeded, the amount of oil fed to the feed motor is further reduced so that it slows down.

However a disadvantage of that apparatus is that it does not provide for an actual control in respect of the power output at the drive motor. More particularly, the amount of oil which can be fed to the drive motor is dependent on the respective position of the valve and is thus not constant. However, it is not possible to achieve a constant level of output power for the machining tool with a fluctuating amount of oil at the drive motor. Although in the event of a rise in pressure in the delivery line, the against of oil in the feed conduit to the feed motor is reduced and the speed of the feed motor is decreased, the same amount of oil is however fed to the drive motor and thus the speed thereof is increased. That is precisely counter-productive and due to the control pulses having an interactive influence, it can result in the dangerous phenomenon of the system hunting up.

An object of the present invention is therefore to eliminate the above-indicated disadvantages and to provide an apparatus of the kind set forth in the opening part of this specification, which permits constant-power operation with the drive motor irrespective of resistance at the machining tool. The invention further seeks to provide that the system is extremely quick to react in order to avoid unnecessary wear or to prevent the machining tool from jamming.

According to the invention that object is attained with an apparatus having the features set forth in claim 1.

As the quantitative divider valve feeds the drive motor with a permanently constant amount of fluid, the output power thereof remains constant irrespective of the control operations occurring at the feed motor. The control pulse for the control valve at the feed motor is formed by the system pressure obtaining between the quantitative divider valve and the drive motor. As the quantitative divider valve is arranged virtually directly at the drive motor, the above-mentioned system pressure practically corresponds to the working pressure of the drive motor. That means that delay of the control pulses due to pressure losses in conduits and fittings is reliably eliminated.

In a particularly advantageous embodiment the control valve is arranged in the return conduit of the feed motor. That provides for the elimination of unnecessary pressure losses between the pump and the feed motor, which would possibly make it necessary to adopt a different design for the feed motor.

In a particularly advantageous embodiment, the control valve is a pressure-controlled change-over or directional control valve with which the feed conduit between the quantitative divider valve and the drive motor can be connected to the return conduit of the feed motor. In that way the flow in the fluid circuit of the feed motor can be precisely influenced. In order to provide for uniform and steady operation of the feed motor, a throttle means which is independent of viscosity is preferably disposed in the return conduit thereof. In that way, irrespective of the operating condition, a predetermined difference is always maintained between the feed conduit and the return conduit of the feed motor.

A particularly good mode of operation of the hydraulic system, in respect of oscillation, is achieved if the quantitative divider valve and the control valve are disposed in a common block which is arranged directly on the drive motor. That can eliminate fluctuations in pressure, caused by the elasticity of the connecting hoses to the pump.

If the machining tool is a circular saw blade, it is particularly advantageous if, besides the feed motor for the forward feed movement of the circular saw blade, there is also a hydraulic depth feed motor for the feed movement in respect of depth of the circular saw blade, with the feed motor and the depth feed motor being connected in series, and if the feed motor or the depth feed motor can be activated alternately by way of change-over valves arranged at said motors. The depth feed of the circular saw blade is ultimately also a feed motion in which fluctuating torque levels may occur at the machining tool. It is therefore desirable for the feed in respect of depth also to be effected not manually but in a power-regulated manner, by means of a motor. The series interconnection is made possible by the fact that there is no need for simultaneous action of the depth feed motor and the forward feed motor.

Embodiments of the invention are described in greater detail hereinafter and illustrated in the drawings in which.

Figure 1:
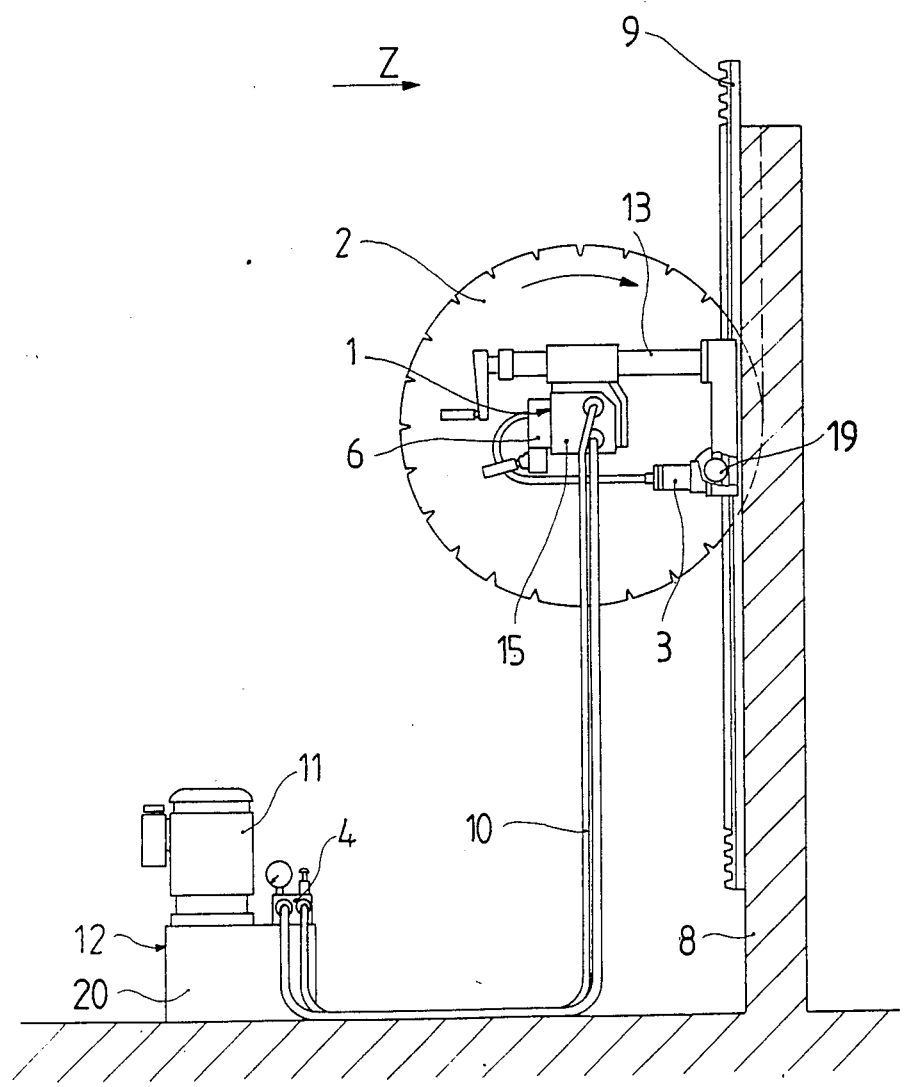
FIG. 1 is a simplified view of an apparatus according to the invention

As shown in FIG. 1, the apparatus essentially comprises a hydraulic supply unit 12 with an electric motor 11 and a hydraulic pump 4. Instead of the electric motor, it would also be possible for example to use an internal combustion engine in order to guarantee operation which is independent of the mains system. The machining tool 2 in the present embodiment is a circular saw blade which is driven by the drive motor 1. Secured directly to the drive motor 1 is the block 15 to which lead the connecting hoses 10 from the supply unit 12 and in which the quantitative divider valve is also disposed. The change-over or directional control valve 6 for cutting the feed motion in and out, and the control valve, are also arranged on the block 15. The entire arrangement is displaceable along a guide pillar 13 which is secured to a carriage 16.

Figure 2:
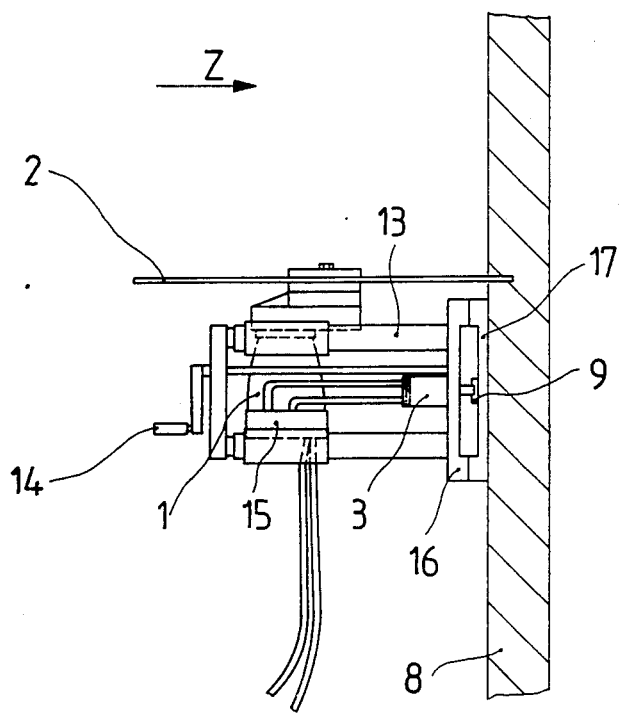
FIG. 2 is a plan view of the machining tool shown in FIG. 1.

The carriage 16 can be slid along a rail 17, as can be seen in particular from FIG. 2. The rail 17 is secured to the masonry 8 to be machined. Integrated into the rail 17 is a rack 9 which meshes with a pinion 32 on the feed motor 3. In the embodiment shown in FIGS. 1 and 2, the feed movement in respect of depth of the machining tool is effected in the direction indicated by the arrow Z manually by a feed crank 14 for rotating a spindle (not shown herein).

Figure 3:
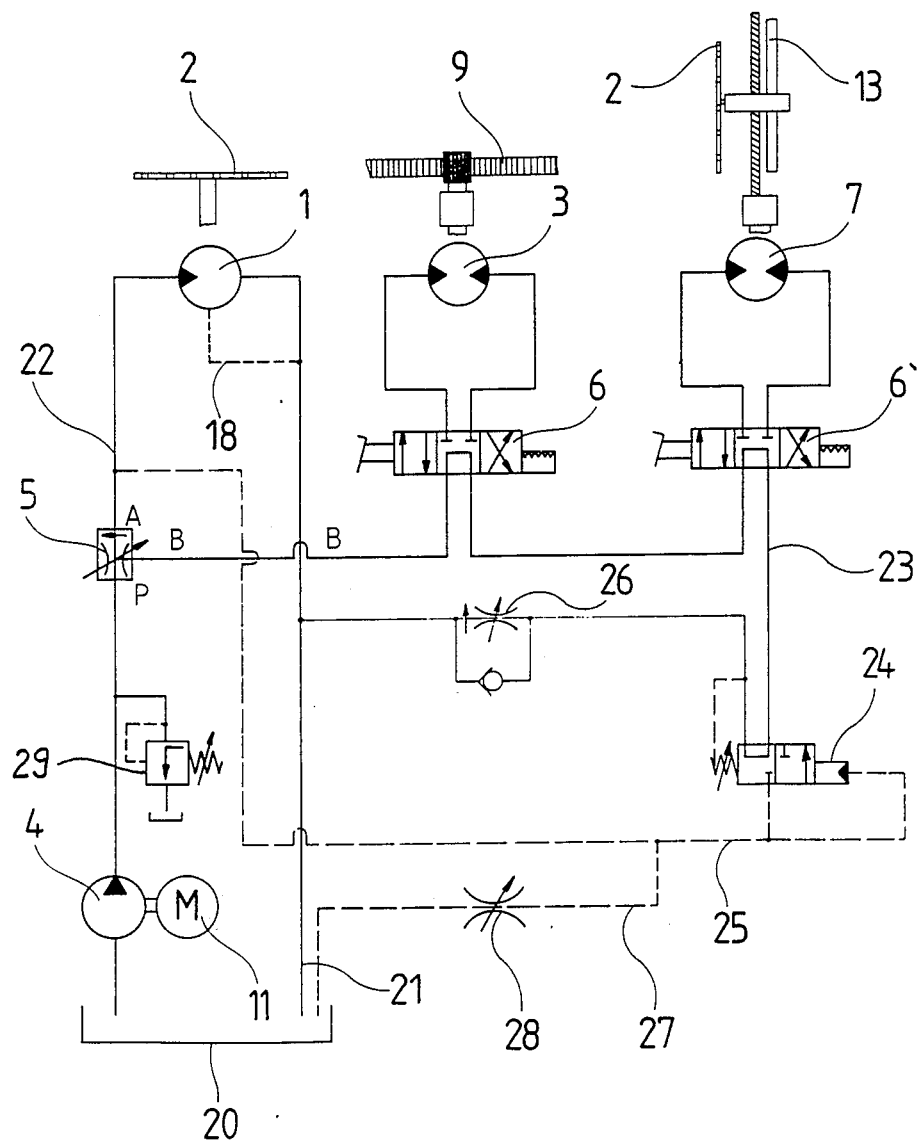
FIG. 3 is a diagrammatic view of a hydraulic control means with drive motor, forward feed motor and depth feed motor.

In the hydraulic control diagram shown in FIG. 3, the feed in respect of depth of the machining tool is effected not manually but by means of a depth feed motor 7. All the motors 1, 3 and 7 are fed by a single hydraulic pump 4 which is driven by the electric motor 11. From the hydraulic pump 4, the pressure line P carries all the oil flow delivered by the pump to the quantitative divider valve 5. A pressure relief valve 29 is disposed therebetween.

The divider valve 5 divides the available oil flow and branches off into the feed conduit 22 to the drive motor 1, a portion of the oil flow, which always remains the same. That amount of oil is set once and for all at the divider valve 5, depending on the design of the drive motor 1, and then remains unaltered. From the drive motor 1 a return conduit 21 carries the oil back into the tank 20. Reference numeral 18 indicates the leakage oil conduit which returns leakage oil from the drive motor 1 directly into the return conduit 21.

The residual amount of oil which is not required at the output A of the divider valve 5 passes by way of the conduit B to the feed motor 3 or to the depth feed motor 7.

Both the feed motor 3 and the depth feed motor 7 can be switched on and off or reversed by way of a change-over valve 6 and 6' respectively. The valves 6 and 6' respectively are each a change-over or directional control valve of per se known type having four connections and three positions. In the neutral position of the valves 6 and 6', that is to say when the valves are not actuated, the oil flow in the conduit B flows away to the tank 20. As soon as one of the valves 6 or 6' is cut in, either the forward feed motor 3 or the depth feed motor 7 is operated. The alternative control of those motors can however also be achieved in a different fashion.

The control valve 24 is disposed in the return conduit 23 from the motors 3 and 7. The control valve 24 is a pressure-controlled change-over valve having three connections and two positions. The control valve 24 is operatively connected by way of the pressure control conduit 25 to the feed conduit 22 between the divider valve 5 and the drive motor 1. A compensating conduit 27, the function of which will be described in greater detail hereinafter, goes to the tank 20. A throttle means 28 is incorporated into the conduit 27.

The control pressure at the control valve 24 is adjustable and is also determined once and for all, in accordance with the prevailing parameters, and then remains unchanged. In a test arrangement, the pressure was set for example to 130 bars. As long as that set control pressure in the feed conduit 22 is not exceeded, the entire amount of oil in the conduit B is passed by way of one of the motors 3 or 7 and by way of the throttle means 26.

If a resistance occurs at the machining tool 2, for example when it encounters an item of iron reinforcement, it will be seen that the pressure in the feed conduit 22 is increased. If that pressure exceeds the set control pressure of for example 130 bars, the position of the control valve 24 begins to change. The return conduit 23 is interrupted at the tank side and short-circuited to the pressure control conduit 25. It will be seen that that results in a pressure compensation effect in the circuit of the motors 3 and 7 so that the amount of oil flowing through those motors can be reduced to zero. The reduction in the speed of or the interruption in the forward feed motion results in the relief of load on the machining tool 2 until the pressure in the feed conduit 22 falls below the set control pressure again and the control valve 24 again takes up the rest position.

Throughout that procedure however, the amount of oil fed to the drive motor 1 remains unaltered. As in the control position of the control valve 24, the amount of oil in the conduit B and in the return conduit 23 is reduced, while on the other hand the total amount of oil delivered remains the same, it is necessary to provide for a relief effect. That is done by way of the compensating conduit 27 in the pressure control conduit 25. The conduit 27 goes by way of a throttle means 28 directly to the tank so that an amount of oil which is not required for a short time can escape, under corresponding pressure. Although, below the control pressure of 130 bars, there is always a small but constant amount of oil that will flow away by way of the conduit 27, the throttle means 28 ensures that that amount of oil is negligible in comparison with the total oil delivery.

It will be appreciated that, instead of the control valve 24, it would also be possible to use another pressure-controlled valve which reduces the oil delivery in the circuit of the motors 3 and 7. Correspondingly, the relief for that circuit of an amount of oil which is not required also does not necessarily have to be effected at the pressure control conduit 25. Instead of the circular saw blade it is also possible for example to use a drilling tool, in which case it will be seen that the functions of forward feed and depth feed are the same.

For operation of the apparatus, the rail 17 is firstly fixed to the masonry 8 to be cut, in the desired direction. The carriage 16 with the machining tool 2 is then pushed on to the rail 17. The hydraulic pump 4 is then actuated so that the machining tool 2 rotates in a no-load condition. The depth feed movement for the machining tool 2 is then produced by way of the crank 14 or, in the embodiment shown in FIG. 3, by actuation of the valve 6', until the tool 2 has reached the desired depth of cut in the masonry 8. The valve 6 is then actuated, the pinion 19 moving the carriage 16 forwardly on the rack 9 in the rail 17. The operator does not have to pay particular attention to the forward feed process in itself, as the control valve 24 regulates the output power at the machining tool. The forward feed movement can be interrupted at any time by actuating the valve 6. In certain situations of use it would also be conceivable for the system to be controlled in such a way as to permit a forward feed movement and a depth feed movement with the drive motor stationary.

I claim:

1. Apparatus for machining relatively hard building materials comprising a drive motor (1), which is supplied by a common hydraulic pump (4), for rotatably driving a rotating machining tool (2), and at least one feed motor (3,7) for forward feed movement of the machining tool, wherein the amount of fluid which can be supplied to the feed motor is controllable by a control valve in dependence on the resistance at the machining tool, characterised in that disposed between the hydraulic pump (4) on the one hand and the drive motor (1) and the feed motor (3,7) on the other hand is a quantitative divider valve (5) by way of which a permanently constant amount of fluid can be supplied to the drive motor (1) and fluid can be supplied to the feed motor and that arranged in the return conduit of the fluid circuit of the feed motor (3,7) is a pressure-controlled change-over control valve (24) for limiting the through-flow amount, which is controllable in dependence on the system pressure between the quantitative divider valve (5) and the drive motor (1), and with which control valve the feed conduit between the quantitative divider valve and the drive motor can be connected to the return conduit of the feed motor.

2. Apparatus as set forth in claim 1 characterised in that a throttle means is arranged in the return conduit of the feed motor.

3. Apparatus as set forth in claim 1 characterised in that the quantitative divider valve (5) and the control valve (24) are disposed in a common block (15) which is arranged directly on the drive motor (1).

4. Apparatus as set forth in claim 1 wherein the machining tool is a circular saw blade characterised in that besides the feed motor (3) for the feed movement of the circular saw blade there is also a hydraulic depth feed motor (7) for the feed in respect of depth of the circular saw blade, wherein the feed motor and the depth feed motor are connected in series, and that the feed motor or the depth feed motor can be activated alternatively by way of change-over valves arranged on said motors.

* * * * *